US011928800B2

(12) United States Patent
Huang (10) Patent No.: US 11,928,800 B2
(45) Date of Patent: Mar. 12, 2024

(54) IMAGE COORDINATE SYSTEM TRANSFORMATION METHOD AND APPARATUS, DEVICE, AND STORAGE MEDIUM (71) Applicant: TENCENT TECHNOLOGY (SHENZHEN) COMPANY LIMITED, Shenzhen (CN)

(72) Inventor: Xiangqi Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 427 days.

(21) Appl. No.: 17/373,768

(22) Filed: Jul. 12, 2021

(65) Prior Publication Data
US 2021/0342990 A1    Nov. 4, 2021

Related U.S. Application Data (63) Continuation of application No. PCT/CN2020/102493, filed on Jul. 16, 2020.

(30) Foreign Application Priority Data

Jul. 31, 2019   (CN) .......................... 201910704514.8

(51) Int. Cl.
G06T 5/50       (2006.01)
G06T 7/11       (2017.01)
(52) U.S. Cl.
CPC ................. G06T 5/50 (2013.01); G06T 7/11 (2017.01); G06T 2207/10016 (2013.01); G06T 2207/20221 (2013.01); G06T 2207/30204 (2013.01)

(58) Field of Classification Search
None
See application file for complete search history.

(56) References Cited

U.S. PATENT DOCUMENTS 5,687,249 A  *  11/1997  Kato ........................ G08G 1/04
                                                        340/936
6,473,536 B1    10/2002  Chiba et al.
(Continued)

FOREIGN PATENT DOCUMENTS

CN          101616310 A      12/2009
CN          101639747 A       2/2010
(Continued)

OTHER PUBLICATIONS

The World Intellectual Property Organization (WIPO) International Search Report for PCT/CN2020/102493 dated Sep. 29, 2020 6 Pages (including translation).
(Continued)

*Primary Examiner* — Anand P Bhatnagar
(74) *Attorney, Agent, or Firm* — ANOVA LAW GROUP, PLLC (57) ABSTRACT

An image coordinate system transformation method includes obtaining video images acquired by adjacent cameras, the adjacent cameras including a first camera and a second camera that have an overlapping photography region on a ground plane, recognizing N groups of key points of a target object on the ground plane from the video images acquired by the adjacent cameras, each group of key points including first key point extracted from a video image of the first camera and a second key point extracted from a video image of the second camera, the first key point and the second key point being the same feature point of the same target object appearing in the adjacent cameras at the same moment, and N being an integer greater than or equal to 3, (Continued)

and calculating a transformation relationship between image coordinate systems of the adjacent cameras according to the N groups of key points.

20 Claims, 6 Drawing Sheets

(56) References Cited

U.S. PATENT DOCUMENTS

| | | | |
|---|---|---|---|
| 8,831,290 B2* | 9/2014 | Ramalingam | G06T 7/579 |
| | | | 382/107 |
| 9,875,411 B2* | 1/2018 | Yu | G06V 20/52 |
| 10,110,879 B2* | 10/2018 | Tian | H04N 13/236 |
| 10,467,454 B2* | 11/2019 | Srivastava | G07G 1/0063 |
| 11,062,478 B2* | 7/2021 | Lasaruk | G06T 7/80 |
| 11,195,329 B2* | 12/2021 | Ding | G06T 7/11 |
| 11,514,680 B2* | 11/2022 | Lu | G06V 10/98 |
| 2011/0013028 A1 | 1/2011 | Zhou et al. | |
| 2012/0274739 A1 | 11/2012 | Li | |
| 2017/0132476 A1* | 5/2017 | Chien | G06T 5/005 |
| 2017/0309034 A1* | 10/2017 | Mueller | G06T 7/80 |
| 2022/0284601 A1* | 9/2022 | Perry | H04N 23/90 |

FOREIGN PATENT DOCUMENTS

| | | |
|---|---|---|
| CN | 101950426 A | 1/2011 |
| CN | 106709436 A | 5/2017 |
| CN | 107845066 A | 3/2018 |
| CN | 109040700 A | 12/2018 |
| CN | 109740413 A | 5/2019 |
| CN | 110458895 A | 11/2019 |
| CN | 111091025 A | 5/2020 |
| JP | 2006145419 A | 6/2006 |
| JP | 2008046761 A | 2/2008 |
| JP | 2012075060 A | 4/2012 |
| JP | 2016218849 A | 12/2016 |
| JP | 2018120283 A | 8/2018 |

OTHER PUBLICATIONS

The State Intellectual Property Office of the People's Republic of China (SIPO) Office Action 1 for for 201910704514.8 dated Sep. 18, 2020 12 Pages (including translation).

Zhihua Li et al, "Continuous Target Tracking Based on Multiple Cameras," Journal of Electronic Measurement and Instrument, vol. 23, No. 2, Feb. 28, 2009 (Feb. 28, 2009), pp. 46-51. 6 pages.

Japan Patent Office (JPO) The Office Action for JP Application No. 2021-545821 dated Oct. 11, 2022 10 Pages (Translation Included).

* cited by examiner

FIG. 6

IMAGE COORDINATE SYSTEM TRANSFORMATION METHOD AND APPARATUS, DEVICE, AND STORAGE MEDIUM

RELATED APPLICATION(S)

This application is a continuation application of PCT Patent Application No. PCT/CN2020/102493, filed on Jul. 16, 2020, which claims priority to Chinese Patent Application No. 201910704514.8, entitled "IMAGE COORDINATE SYSTEM TRANSFORMATION METHOD AND APPARATUS, DEVICE, AND STORAGE MEDIUM" and filed on Jul. 31, 2019, all of which are incorporated herein by reference in entirety.

FIELD OF THE TECHNOLOGY

The present disclosure relates to the field of computer vision technologies, and in particular, to an image coordinate system transformation method and apparatus, a device, and a storage medium.

BACKGROUND

Multiple cameras may be employed in a wide-range video surveillance scenario, and a transformation relationship between image coordinate systems of different cameras may be obtained by analyzing and processing images captured by the cameras.

Certain calibration methods are used for transformations between image coordinate systems of different cameras. For example, a checkerboard used for calibration is first placed on a fixed plane, then a plurality of groups of checkerboard feature points are detected and a transformation model is obtained through calculation, to obtain a transformation relationship between a checkerboard coordinate system and a camera coordinate system, and image coordinate systems of different cameras are then transformed into the same checkerboard coordinate system.

For transformations between image coordinate systems of different cameras, a checkerboard may need to be used for calibration. When images captured by a plurality of cameras are processed, such a process may become time-consuming and labor-intensive, and thus not necessarily suitable for the wide-range video surveillance scenario.

SUMMARY

Embodiments of the present disclosure provide an image coordinate system transformation method and apparatus, a device, and a storage medium, which help improve processing efficiency for images captured by cameras and are applicable to a wide-range video surveillance scenario. The technical solutions are as follows:

In one aspect, the present disclosure provides an image coordinate system transformation method, applicable to a computing device, the method including: obtaining video images acquired by adjacent cameras, the adjacent cameras including a first camera and a second camera that have an overlapping photography region on a ground plane; recognizing N groups of key points of a target object on the ground plane from the video images acquired by the adjacent cameras, each group of key points including a first key point extracted from a video image of the first camera and a second key point extracted from a video image of the second camera, the first key point and the second key point being the same feature point of the same target object appearing in the adjacent cameras at the same moment, and N being an integer greater than or equal to 3; and calculating a transformation relationship between image coordinate systems of the adjacent cameras according to the N groups of key points.

In another aspect, the present disclosure provides an image coordinate system transformation apparatus. The apparatus includes: a memory storing computer program instructions; and a processor coupled to the memory and configured to execute the computer program instructions and perform: obtaining video images acquired by adjacent cameras, the adjacent cameras including a first camera and a second camera that have an overlapping photography region on a ground plane; recognizing N groups of key points of a target object on the ground plane from the video images acquired by the adjacent cameras, each group of key points including a first key point extracted from a video image of the first camera and a second key point extracted from a video image of the second camera, the first key point and the second key point being the same feature point of the same target object appearing in the adjacent cameras at the same moment, and N being an integer greater than or equal to 3; and calculating a transformation relationship between image coordinate systems of the adjacent cameras according to the N groups of key points.

In yet another aspect, the present disclosure provides a non-transitory computer-readable storage medium storing computer program instructions executable by at least one processor to perform: obtaining video images acquired by adjacent cameras, the adjacent cameras including a first camera and a second camera that have an overlapping photography region on a ground plane; recognizing N groups of key points of a target object on the ground plane from the video images acquired by the adjacent cameras, each group of key points including a first key point extracted from a video image of the first camera and a second key point extracted from a video image of the second camera, the first key point and the second key point being the same feature point of the same target object appearing in the adjacent cameras at the same moment, and N being an integer greater than or equal to 3; and calculating a transformation relationship between image coordinate systems of the adjacent cameras according to the N groups of key points In yet another aspect, the present disclosure provides an image coordinate system transformation apparatus, the apparatus including: a video obtaining module, configured to obtain video images acquired by adjacent cameras, the adjacent cameras including a first camera and a second camera that have an overlapping photography region on a ground plane; a detection and recognition module, configured to recognize N groups of key points of a target object on the ground plane from the video images acquired by the adjacent cameras, each group of key points including a first key point extracted from a video image of the first camera and a second key point extracted from a video image of the second camera, the first key point and the second key point being the same feature point of the same target object appearing in the adjacent cameras at the same moment, and N being an integer greater than or equal to 3; and a relationship calculation module, configured to calculate a transformation relationship between image coordinate systems of the adjacent cameras according to the N groups of key points.

The technical solutions provided in the embodiments of the present disclosure may bring the following beneficial effects:

N groups of key points are extracted from video images captured by adjacent cameras, to model a transformation relationship between image coordinate systems of the adjacent cameras, so that a related-art problem of a time-consuming and labor-intensive process requiring manual placement of a checkerboard for calibration is resolved. In this implementation, a key point recognition result is obtained through target object tracking and key point recognition, and a transformation relationship between image coordinate systems corresponding to different cameras can be obtained based on the key point recognition result. In certain particular instances, the entire process is autonomously performed by a computer device, without necessarily needing human participation, thereby helping improve processing efficiency for images captured by cameras and applicable to a wide-range video surveillance scenario.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

In one or more embodiments of the present disclosure, the term "computer device" is employed herein interchangeably with the term "computing device." The computing device may be a desktop computer, a server, a hand held computer, a smart phone, or the like.

Artificial Intelligence (AI) is a theory, method, technology, and implementation system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition.

The solutions provided in the embodiments of the present disclosure relate to technologies such as CV of AI, and are described by using the following embodiments:

To make the objectives, technical solutions, and advantages of the present disclosure clearer, the following further describes implementations of the present disclosure in detail with reference to the accompanying drawings.

Figure 1:
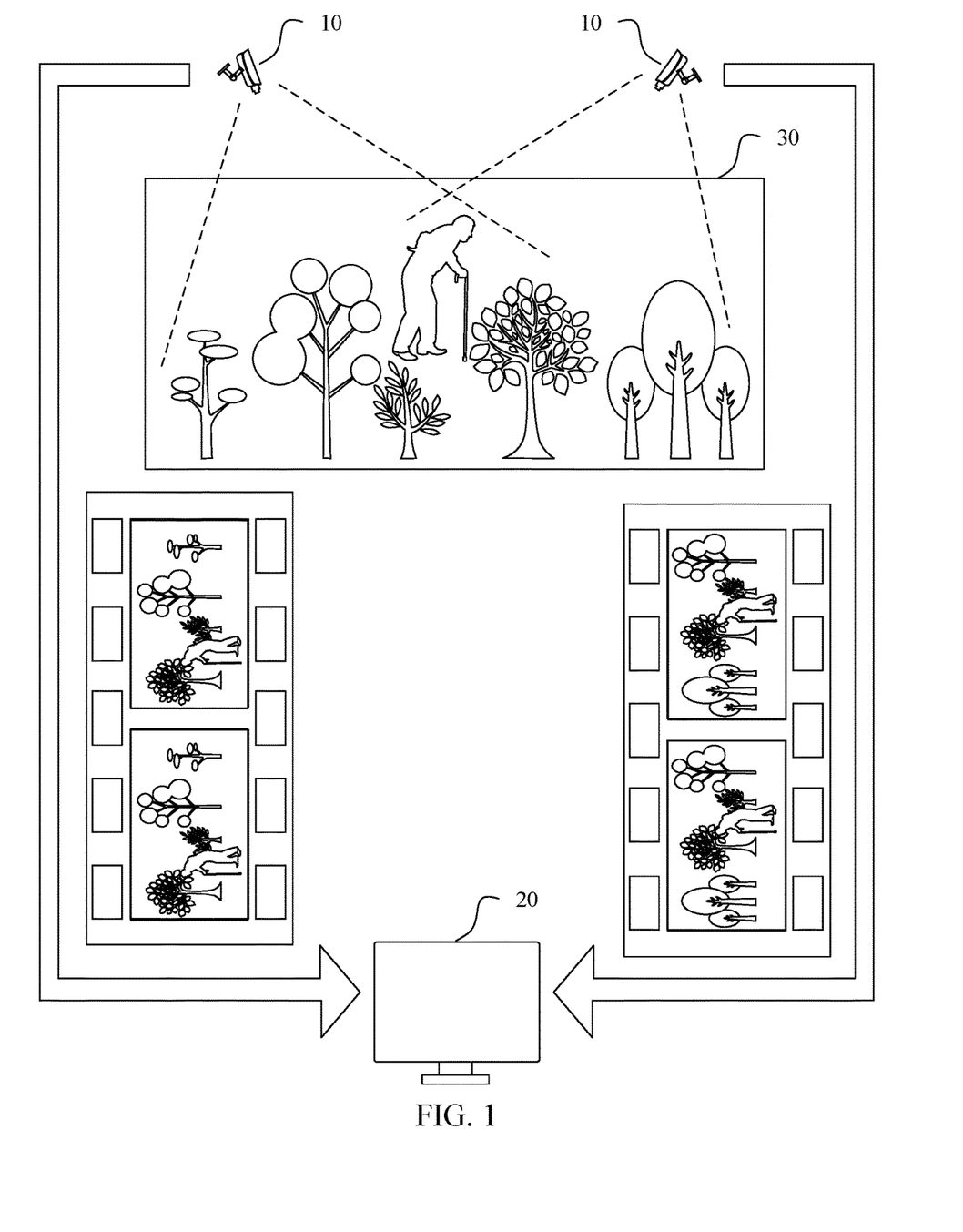
FIG. 1 is a schematic diagram of an implementation environment according to one or more embodiments of the present disclosure.

FIG. 1 is a schematic diagram of an implementation environment according to an embodiment of the present disclosure. The implementation environment may include a camera 10 and a computer device 20.

The camera 10 is configured to capture images within a field of view of the camera to generate a video stream. In the embodiments of the present disclosure, there are a plurality of cameras 10. For example, as shown in FIG. 1, a plurality of cameras 10 are deployed at different positions of a realistic scene 30, and each camera 10 is configured to monitor a part of region of the realistic scene 30 to obtain a corresponding video stream.

The computer device 20 refers to a device with a data processing function and a data storage function, for example, a personal computer (PC), a server, or another electronic device with a computing capability, which is not limited in the embodiments of the present disclosure. The computer device 20 may receive the video streams of the plurality of cameras 10 and decode the video streams into images, and then perform subsequent processing, such as calculating a transformation relationship between image coordinate systems of two cameras.

The camera 10 may communicate with the computer device 20 in a wired or wireless manner. For example, data transmission between the camera 10 and the computer device 20 may be performed in a device to device (Ad-Hoc) manner, or may be performed under coordination of a base station or a wireless access point (AP), which is not limited in the embodiments of the present disclosure.

Figure 2:
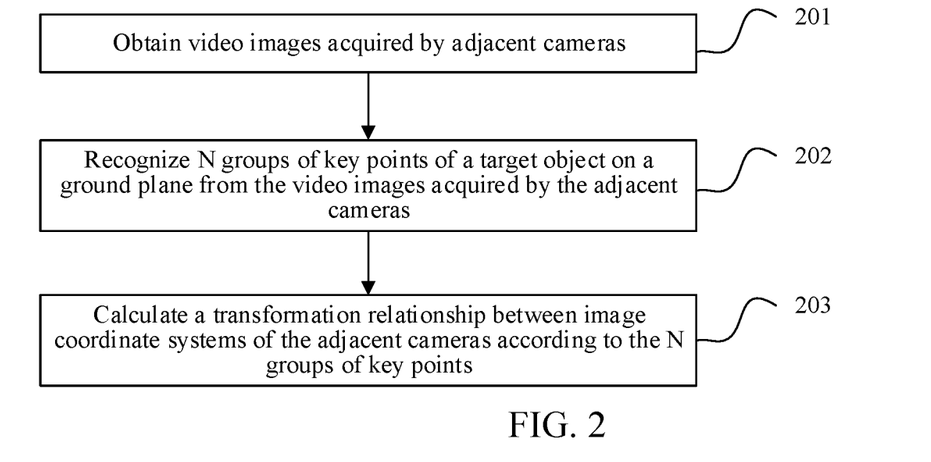
FIG. 2 is a flowchart of an image coordinate system transformation method according to one or more embodiments of the present disclosure.

FIG. 2 is a flowchart of an image coordinate system transformation method according to an embodiment of the present disclosure. The method is applicable to the computer device of the implementation environment shown in FIG. 1. The method may include the following steps (201 to 203):

Step 201. Obtain video images acquired by adjacent cameras.

In the embodiments of the present disclosure, the adjacent cameras include a first camera and a second camera that have an overlapping photography region on a ground plane. If two cameras are disposed adjacent to each other, and photography regions of the two cameras have an overlapping region on the ground plane, the two cameras are adjacent cameras.

In addition, the computer device may decode a video stream acquired by the first camera and a video stream acquired by the second camera respectively, to obtain a plurality of frames of video images acquired by the first camera and a plurality of frames of video images acquired by the second camera.

In addition, to capture a person or an object passing through under a camera as much as possible, a frame rate of a video stream acquired by the camera cannot be too low, for example, the frame rate is to be greater than or equal to 25 frames per second, which is not limited in the embodiments of the present disclosure.

In certain embodiments, the computer device may further align time of the first camera and that of the second camera, that is, maintain the time of the first camera and that of the second camera synchronized. For example, the computer device may align the time of the first camera and the time of the second camera with standard time respectively. In this way, when key point detection is performed subsequently, accuracy of extracted groups of key points in the time domain can be ensured.

Step 202. Recognize N groups of key points of a target object on a ground plane from the video images acquired by the adjacent cameras.

The computer device first detects a target object in the video images by using a target detection technology. In certain embodiments, the computer device may detect the target object by using a method such as Single Shot Multi-Box Detector (SSD), You Only Look Once (YOLO), or the like, which is not limited in the embodiments of the present disclosure. In certain embodiments, after the target object is detected, the computer device tracks the detected target object by using a target tracking technology. In certain embodiments, the computer device may track the target object by using a correlation filtering algorithm such as Kernelized Correlation Filters and a deep neural network-based tracking algorithm (for example, a Siamese network), which is not limited in the embodiments of the present disclosure.

The target object refers to an object detected by the computer device in the video images acquired by the adjacent cameras. The target object may include one object, or may include a plurality of objects. In the embodiments of the present disclosure, the object may be a movable entity, namely, a dynamic entity, such as a pedestrian, an animal, or a conveyance (for example, a vehicle), or may be an immovable entity, namely, a static entity, such as a stone, a tree, or a building. In certain embodiments, the dynamic entity may be an entity that moves autonomously, such as a pedestrian or a mobile robot, or may be an entity that cannot move autonomously such as a telecontrol racing car or a conveyance.

After the target object is detected, the computer device then performs key point detection on the target object by using a key point detection technology. In certain embodiments, the computer device may perform key point detection on the target object by using a deep neural network-related algorithm such as Mask R-CNN, which is not limited in the embodiments of the present disclosure.

The computer device recognizes N groups of key points on the ground plane of the target object by using the key point detection technology, where N is an integer greater than or equal to 3. Each group of key points includes a first key point extracted from a video image of the first camera and a second key point extracted from a video image of the second camera, and the first key point and the second key point are the same feature point of the same target object appearing in the adjacent cameras at the same moment.

In certain embodiments, the N groups of key points may come from video images of the same target object at N different moments, or may come from video images of N different target objects at the same moment, or some of the N groups of key points may come from video images of the same target object at different moments while some come from video images of different target objects at the same moment. In addition, the N groups of key points may all come from the dynamic entity, or may all come from the static entity, or some of the N groups of key points may come from the dynamic entity while some come from the static entity. A specific obtaining manner of the N groups of key points is not limited in the embodiments of the present disclosure.

Step 203. Calculate a transformation relationship between image coordinate systems of the adjacent cameras according to the N groups of key points.

An image coordinate system of a camera refers to a coordinate system of an image captured by the camera. The transformation relationship between image coordinate systems of the adjacent cameras refers to a transformation relationship of position coordinates of the object between the image coordinate systems of the adjacent cameras.

It is assumed that an imaging process of the camera conforms to the pinhole camera model and a video image captured by the camera is not distorted. In this case, a nature that imaging of a ground plane in a physical world projected into a picture of the camera satisfies affine transformation may be used, to infer that mapping between ground plane parts in pictures of adjacent cameras that have an overlapping photography region of the ground plane also satisfies affine transformation. The computer device may model the transformation relationship between the image coordinate systems corresponding to the adjacent cameras by using the N groups of key points, to obtain a mathematical model representing the transformation relationship.

In certain embodiments, the mathematical model may be an affine transformation model, and the affine transformation model is used for converting the position coordinates of the object between the image coordinate systems of the adjacent cameras.

In certain embodiments, to remove possible interfering key points, parameters of the mathematical model may be estimated by using a random sample consensus (RANSAC) algorithm. The interfering key points refer to M groups of key points that do not conform to a mathematical model with a smallest error, where M is a natural number. For example, the computer device obtains 100 groups of key points from the adjacent cameras, and selects three groups from the 100 groups to calculate the mathematical model, the remaining 97 groups of key points being used for calculating an error of the obtained mathematical model. Finally, the computer device selects a mathematical model with a smallest error mean or a smallest error variance to perform operations such as estimating parameters of the mathematical model. When the computer device estimates the parameters of the mathematical model, the RANSAC algorithm may be used, so that M groups of key points whose errors with the mathematical model are greater than an error threshold may be removed, making estimated parameters of the mathematical model more accurate. The error threshold is a value set according to an actual implementation requirement, for example, in a case of a relatively high accuracy requirement, a value of the error threshold is relatively small, which is not limited in the embodiments of the present disclosure.

In certain implementations, the foregoing step 203 may be: calculating an affine transformation matrix between the image coordinate systems of the adjacent cameras according to the N groups of key points, the affine transformation matrix being used for representing the transformation relationship between the image coordinate systems of the adjacent cameras.

Figure 3:
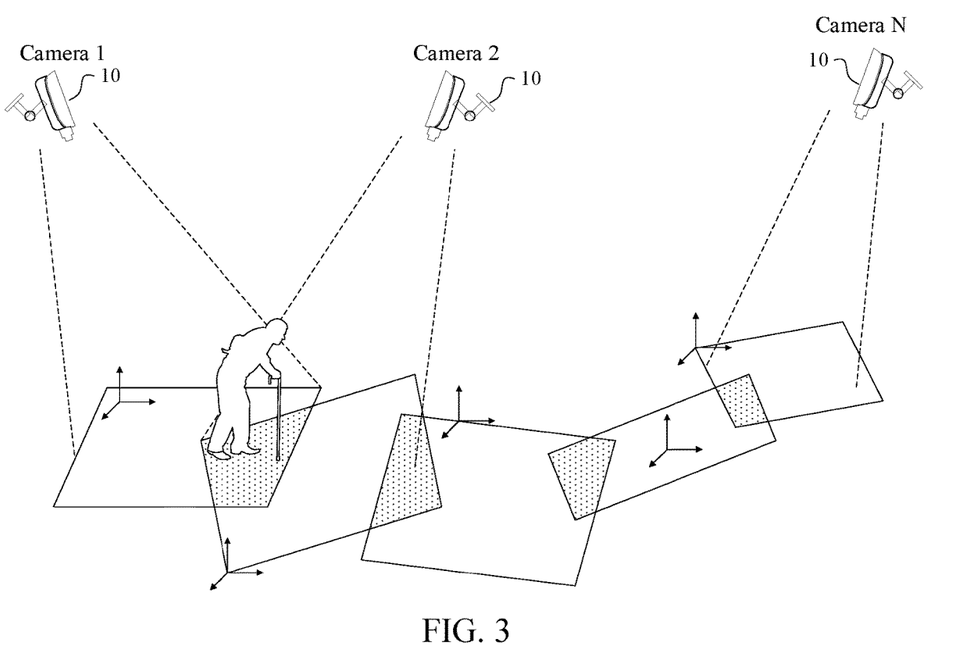
FIG. 3 is a schematic diagram of an image coordinate system transformation method according to one or more embodiments of the present disclosure.

In certain embodiments, after step 203, the method may further include: calculating, for any object obtained through detection and tracking from the video image of the first camera, position coordinates of the object in an image coordinate system corresponding to the second camera according to position coordinates of the object in an image coordinate system corresponding to the first camera and the transformation relationship. For example, referring to FIG. 3, in this implementation scenario, there are a plurality of cameras 10, denoted as a camera 1, a camera 2, . . . , and a camera N. Each two of the plurality of cameras have a ground plane overlapping photography region, that is, the camera 1 and the camera 2 have a ground plane overlapping photography region, the camera 2 and a camera 3 have a ground plane overlapping photography region, . . . , and so on. If there is a pedestrian in the ground plane overlapping photography region between the camera 1 and the camera 2, position coordinates of the pedestrian in an image coordinate system of the camera 2 may be calculated according to position coordinates of the pedestrian in an image coordinate system of the camera 1 and the transformation relationship. In certain embodiments, the computer device may continue to calculate position coordinates of the pedestrian in an image coordinate system of the camera 3 according to the position coordinates of the pedestrian in the image coordinate system of the camera 2, . . . , and calculate position coordinates of the pedestrian in an image coordinate system of the camera N according to position coordinates of the pedestrian in an image coordinate system of a camera N−1, and switching of the object between cameras may then be performed.

Based on the above, according to the technical solutions provided in the embodiments of the present disclosure, N groups of key points are extracted from video images captured by adjacent cameras, to model a transformation relationship between image coordinate systems of the adjacent cameras, so that a related-art problem of a time-consuming and labor-intensive process requiring manual placement of a checkerboard for calibration is resolved. In this implementation, a key point recognition result is obtained through target object tracking and key point recognition, and a transformation relationship between image coordinate systems corresponding to different cameras can be obtained based on the key point recognition result. In certain particular instances, the entire process is autonomously performed by a computer device, without necessarily needing human participation, thereby helping improve processing efficiency for images captured by cameras and applicable to a wide-range video surveillance scenario.

In an exemplary embodiment, the recognizing, by the computer device, N groups of key points of a target object on a ground plane from the video images acquired by the adjacent cameras includes the following steps:

1. Perform target detection and tracking on the video images acquired by the adjacent cameras respectively, to obtain a detection and tracking result corresponding to the first camera and a detection and tracking result corresponding to the second camera.

The detection and tracking result corresponding to the first camera refers to a detection and tracking result of a target object in the first camera, and may include information such as a position, an appearance feature, and a timestamp of the target object. The detection and tracking result corresponding to the second camera refers to a detection and tracking result of a target object in the second camera, and may include information such as a position, an appearance feature, and a timestamp of the target object.

For a video stream acquired by the first camera, the computer device may detect and track the target object in each frame of video image in the video stream, or may detect and track the target object at intervals of several frames of video image, for example, detect and track the target object at intervals of five frames of video images, that is, detect and track the target object in a first frame, a sixth frame, an eleventh frame, a sixteenth frame, and so on of video images.

Similarly, for a video stream acquired by the second camera, the computer device may also detect and track the target object in each frame of video image in the video stream, or may detect and track the target object at intervals of several frames of video image.

If the computer device detects and tracks the target object at intervals of several frames of video images for the video streams acquired by the first camera and the second camera, an interval selected by the computer device for processing the video stream of the first camera is the same as an interval selected for processing the video stream of the second camera.

2. Sift out a standard target object according to the detection and tracking result corresponding to the first camera and the detection and tracking result corresponding to the second camera.

The standard target object refers to the same target object appearing in the adjacent cameras at the same moment. For example, the target object is a pedestrian A. If the pedestrian A appears in both the first camera and the second camera at the same moment, the pedestrian A may be used as the standard target object.

In certain implementations, the computer device may sift out the standard target object in the following manner:

(1) Obtain, according to the detection and tracking result corresponding to the first camera, an appearance feature of a first target object obtained through detection and tracking from a first video image acquired by the first camera.

(2) Obtain, according to the detection and tracking result corresponding to the second camera, an appearance feature of a second target object obtained through detection and tracking from a second video image acquired by the second camera.

The appearance feature represents features such as a color, a shape, and a texture of the target object. For example, feature extraction is performed on an image region corresponding to the target object in the video image, to obtain the appearance feature of the target object. For example, the target object is a pedestrian. The appearance feature of the target object may be obtained by using a person re-identification technology and/or a face recognition technology, and a specific means of obtaining the appearance feature is not limited in the embodiments of the present disclosure. In addition, the first video image and the second video image are video images acquired by the adjacent cameras at the same moment.

Step (1) and step (2) may be performed at the same moment, or may be performed successively. For example, step (1) is performed first and step (2) is then performed, or step (2) is performed first and step (1) is then performed, which is not limited in the embodiments of the present disclosure.

(3) Calculate a similarity between the appearance feature of the first target object and the appearance feature of the second target object.

The similarity is used for representing a degree of similarity between the appearance feature of the first target object and the appearance feature of the second target object.

In certain embodiments, the similarity between the appearance feature of the first target object and the appearance feature of the second target object is calculated by using the following steps:

(3-1) Calculate a distance value between a k-dimensional appearance feature included in the detection and tracking result of the first target object and a k-dimensional appearance feature included in the detection and tracking result of the second target object, k being a positive integer.

(3-2) Calculate the similarity between the appearance feature of the first target object and the appearance feature of the second target object according to the distance value.

The similarity between the appearance feature of the first target object and the appearance feature of the second target object is determined according to the distance value between the k-dimensional appearance features, and the distance value may be represented by using a cosine distance or a Euclidean distance. In certain embodiments, the distance value is represented by using a non-normalized Euclidean distance, and the similarity can be represented more intuitively in terms of value when the distance value is represented in such a manner. In addition, the computer device may directly determine the distance value as the similarity, or may convert the distance value into the similarity based on a preset conversion rule, which is not limited in the embodiments of the present disclosure.

(4) Determine that the first target object and the second target object are the standard target object when or in response to determining the similarity is greater than a similarity threshold.

In addition, if the similarity is less than the similarity threshold, the first target object and the second target object are removed.

3. Perform key point detection on the standard target object to obtain the N groups of key points.

The performing key point detection on the standard target object refers to detecting positions of key points of the standard target object. In the embodiments of the present disclosure, since the transformation relationship between the image coordinate systems of the adjacent cameras is calculated, in order to improve the accuracy of the calculation, key points of the standard target object on the ground plane are mainly detected. For example, the standard target object is a pedestrian. Key points of the pedestrian may include a foot key point, midpoints of connecting lines between two feet, and key points of other parts. For example, the standard target object is a stone. Key points of the stone may be a midpoint of a surface intersecting with the ground plane. In the embodiments of the present disclosure, the N groups of key points are not collinear, to ensure that the N groups of key points can form a plane.

In certain embodiments, to make the selected N groups of key points more reliable, after the N groups of key points are obtained, the method further includes: obtaining, for each group of key points, a confidence level corresponding to the key point, and removing the key point when or in response to determining the confidence level corresponding to the key point is less than a confidence level threshold. The confidence level corresponding to the key point is used for indicating a level of credibility of the key point, and the confidence level corresponding to the key point may be given when or after key point detection is performed on the standard target object, which is not limited in the embodiments of the present disclosure.

In certain embodiments, to avoid mismatching of data and improve accuracy of calculation of the transformation relationship between the image coordinate systems of the adjacent cameras, before the sifting out a standard target object according to the detection and tracking result corresponding to the first camera and the detection and tracking result corresponding to the second camera, the method further includes: sifting out a first video image and a second video image that meet a condition according to the detection and tracking result corresponding to the first camera and the detection and tracking result corresponding to the second camera. In certain embodiments, the condition includes that a quantity of target objects obtained through detection and tracking from the first video image is 1 and a quantity of target objects obtained through detection and tracking from the second video image is also 1. In other words, pictures with a plurality of persons existing in the first video image and the second video image are removed, thereby further avoiding mismatching of data.

Based on the above, in the embodiments of the present disclosure, when the N groups of key points of the adjacent cameras are extracted, the appearance feature and the confidence level of the key points of the target object are comprehensively considered, so that the obtained N groups of key points are more reliable, and the accuracy of the transformation relationship calculated according to the N groups of key points is improved.

The following describes apparatus embodiments of the present disclosure, which can be used for executing the method embodiments of the present disclosure. For details not disclosed in the apparatus embodiments of the present disclosure, refer to the method embodiments of the present disclosure.

Figure 4:
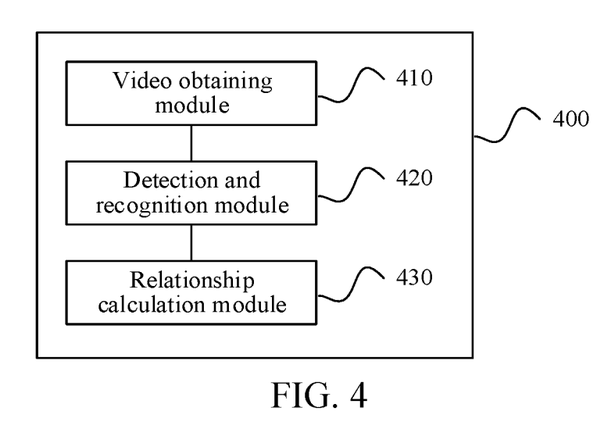
FIG. 4 is a block diagram of an image coordinate system transformation apparatus according to one or more embodiments of the present disclosure.

FIG. 4 is a block diagram of an image coordinate system transformation apparatus according to an embodiment of the present disclosure. The apparatus 400 has functions of implementing the foregoing method embodiments. The functions may be implemented by hardware, or may be implemented by hardware executing corresponding software. The apparatus 400 may be the computer device described above, or may be disposed in the computer device. The apparatus 400 may include a video obtaining module 410, a detection and recognition module 420, and a relationship calculation module 430.

The video obtaining module 410 is configured to obtain video images acquired by adjacent cameras, the adjacent cameras including a first camera and a second camera that have an overlapping photography region on a ground plane.

The detection and recognition module 420 is configured to recognize N groups of key points of a target object on the ground plane from the video images acquired by the adjacent cameras, each group of key points including a first key point extracted from a video image of the first camera and a second key point extracted from a video image of the second camera, the first key point and the second key point being the same feature point of the same target object appearing in the adjacent cameras at the same moment, and N being an integer greater than or equal to 3.

The relationship calculation module 430 is configured to calculate a transformation relationship between image coordinate systems of the adjacent cameras according to the N groups of key points.

Figure 5:
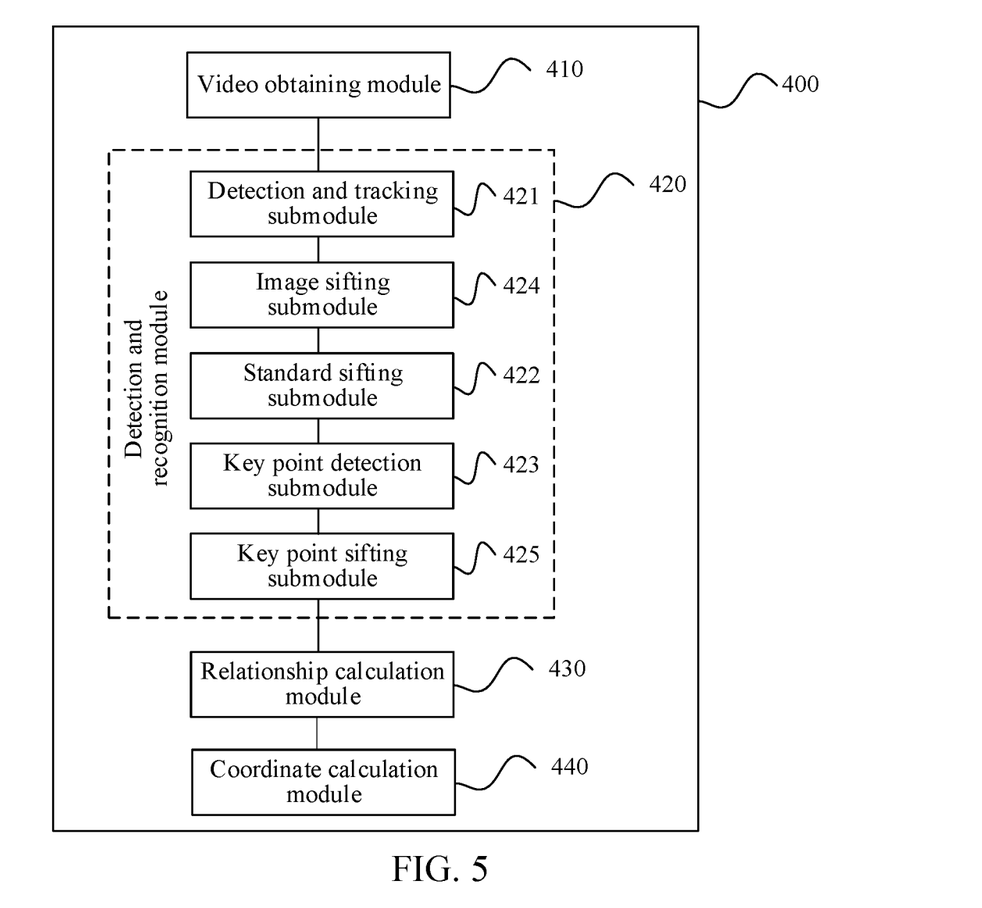
FIG. 5 is a block diagram of an image coordinate system transformation apparatus according to one or more embodiments of the present disclosure.

In an exemplary embodiment, referring to FIG. 5, the detection and recognition module 420 includes a detection and tracking submodule 421, a standard sifting submodule 422, and a key point detection submodule 423.

The detection and tracking submodule 421 is configured to perform target detection and tracking on the video images acquired by the adjacent cameras respectively, to obtain a detection and tracking result corresponding to the first camera and a detection and tracking result corresponding to the second camera.

The standard sifting submodule 422 is configured to sift out a standard target object according to the detection and tracking result corresponding to the first camera and the detection and tracking result corresponding to the second camera, the standard target object being the same target object appearing in the adjacent cameras at the same moment.

The key point detection submodule 423 is configured to perform key point detection on the standard target object to obtain the N groups of key points.

In an exemplary embodiment, referring to FIG. 5, the standard sifting submodule 422 is configured to: obtain, according to the detection and tracking result corresponding to the first camera, an appearance feature of a first target object obtained through detection and tracking from a first video image acquired by the first camera; obtain, according to the detection and tracking result corresponding to the second camera, an appearance feature of a second target object obtained through detection and tracking from a second video image acquired by the second camera, the first video image and the second video image being video images acquired by the adjacent cameras at the same moment; calculate a similarity between the appearance feature of the first target object and the appearance feature of the second target object; and determine that the first target object and the second target object are the standard target object when or in response to determining the similarity is greater than a similarity threshold.

In an exemplary embodiment, referring to FIG. 5, the detection and recognition module 420 further includes: an image sifting submodule 424, configured to sift out the first video image and the second video image that meet a condition according to the detection and tracking result corresponding to the first camera and the detection and tracking result corresponding to the second camera, the condition including that a quantity of target objects obtained through detection and tracking from the first video image is 1 and a quantity of target objects obtained through detection and tracking from the second video image is also 1.

In an exemplary embodiment, referring to FIG. 5, the key point detection submodule 423 is configured to extract, when or in response to determining the standard target object is a pedestrian, midpoints of connecting lines between two feet of the standard target object, to obtain the N groups of key points.

In an exemplary embodiment, referring to FIG. 5, the detection and recognition module 420 further includes: a key point sifting submodule 425, configured to obtain, for each group of key points, a confidence level corresponding to the key point; and remove the key point when or in response to determining the confidence level corresponding to the key point is less than a confidence level threshold.

In an exemplary embodiment, the N groups of key points come from video images of the same target object at N different moments.

In an exemplary embodiment, referring to FIG. 5, the relationship calculation module 430 is configured to calculate an affine transformation matrix between the image coordinate systems of the adjacent cameras according to the N groups of key points.

In an exemplary embodiment, referring to FIG. 5, the apparatus 400 further includes: a coordinate calculation module 440, configured to calculate, for any object obtained through detection and tracking from the video image of the first camera, position coordinates of the object in an image coordinate system corresponding to the second camera according to position coordinates of the object in an image coordinate system corresponding to the first camera and the transformation relationship.

Based on the above, according to the technical solutions provided in the embodiments of the present disclosure, N groups of key points are extracted from video images captured by adjacent cameras, to model a transformation relationship between image coordinate systems of the adjacent cameras, so that a related-art problem of a time-consuming and labor-intensive process requiring manual placement of a checkerboard for calibration is resolved. In this implementation, a key point recognition result is obtained through target object tracking and key point recognition, and a transformation relationship between image coordinate systems corresponding to different cameras can be obtained based on the key point recognition result. In certain particular instances, the entire process is autonomously performed by a computer device, without necessarily needing human participation, thereby helping improve processing efficiency for images captured by cameras and applicable to a wide-range video surveillance scenario.

When the apparatus provided in the foregoing embodiments of the present disclosure implements the functions of the apparatus, only division of the foregoing functional modules is used as an example for description. In the practical implementation, the functions may be allocated to and performed by different functional modules according to requirements. That is, an internal structure of the apparatus is divided into different functional modules, to perform all or some of the functions described above. In addition, the apparatus and method embodiments provided in the foregoing embodiments belong to the same concept. For the specific implementation process, reference may be made to the method embodiments, and details are not described herein again.

Figure 6:
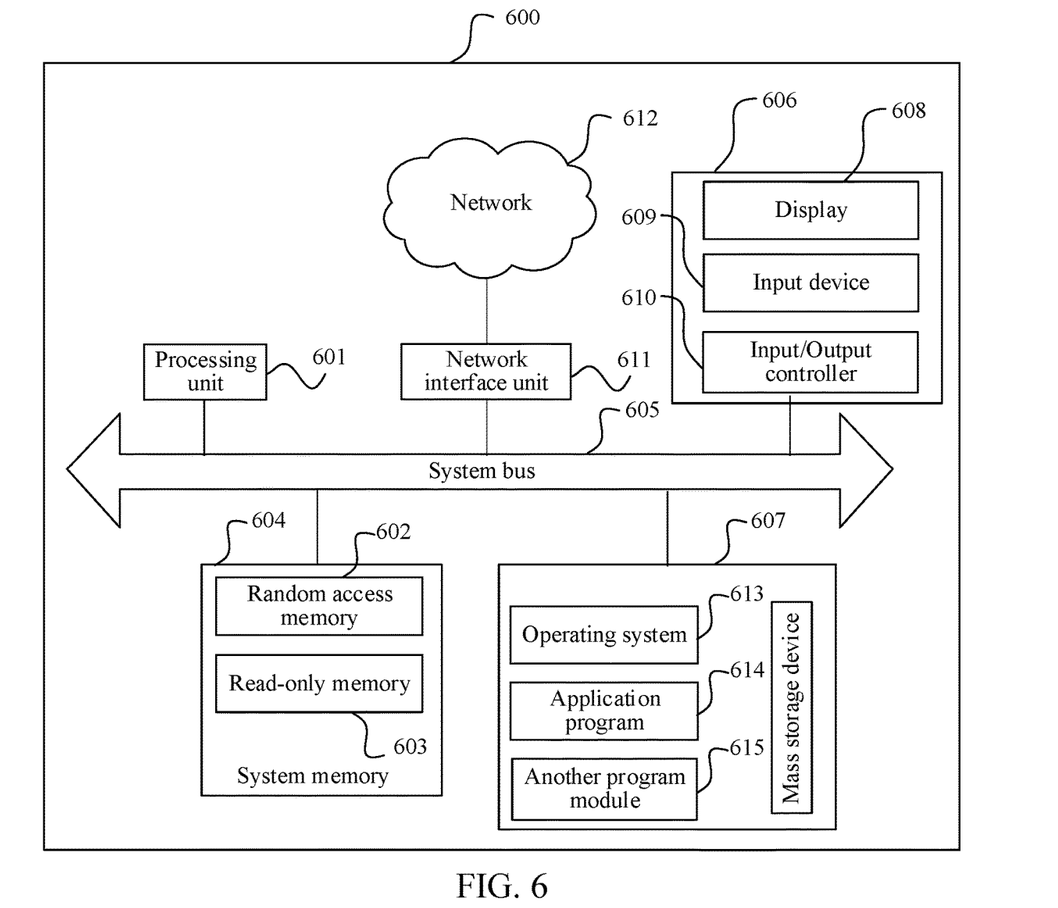
FIG. 6 is a structural block diagram of a computer device according to one or more embodiments of the present disclosure.

FIG. 6 is a schematic block diagram of a computer device according to an embodiment of the present disclosure. The computer device may be configured to implement the image coordinate system transformation method provided in the foregoing embodiments. For example, the computer device may be the computer device 20 in the implementation environment shown in FIG. 1.

The computer device 600 includes a processing unit (for example, a central processing unit (CPU), a graphics processing unit (GPU), or a field programmable gate array (FPGA)) 601, a system memory 604 including a random access memory (RAM) 602 and a read-only memory (ROM) 603, and a system bus 605 connecting the system memory 604 and the CPU 601. The computer device 600 further includes a basic input/output system (I/O system) 606 for helping information transmission between components in the computer device, and a mass storage device 607 configured to store an operating system 613, an application program 614, and another program module 612.

The basic I/O system 606 includes a display 608 configured to display information and an input device 609, such as a mouse or a keyboard, for a user to input information. The display 608 and the input device 609 are both connected to the CPU 601 by using an input/output controller 610 connected to the system bus 605. The basic I/O system 606 may further include the I/O controller 610 configured to receive and process inputs from a plurality of other devices such as a keyboard, a mouse, or an electronic stylus. Similarly, the I/O controller 610 further provides an output to a display screen, a printer, or another type of output device.

The mass storage device 607 is connected to the CPU 601 by using a mass storage controller (not shown) connected to the system bus 605. The mass storage device 607 and an associated computer-readable medium provide non-volatile storage for the computer device 600. In other words, the mass storage device 607 may include the computer-readable medium (not shown) such as a hard disk or a CD-ROM driver.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. A person skilled in the art can know that the computer storage medium is not limited to the foregoing several types. The system memory 604 and the mass storage device 607 may be collectively referred to as a memory.

According to the embodiments of the present disclosure, the computer device 600 may be further connected, through a network such as the Internet, to a remote computer on the network and run. That is, the computer device 600 may be connected to a network 612 by using a network interface unit 611 connected to the system bus 605, or may be connected to another type of network or a remote computer system (not shown) by using a network interface unit 611.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The memory further includes at least one instruction, at least one program, a code set, or an instruction set. The at least one instruction, the at least one program, the code set, or the instruction set is stored in the memory and is configured to be executed by one or more processors to implement the foregoing image coordinate system transformation method.

In an exemplary embodiment, a computer-readable storage medium is further provided, the storage medium stores at least one instruction, at least one program, a code set, or an instruction set, and the at least one instruction, the at least one program, the code set, or the instruction set, when executed by a processor, implementing the foregoing image coordinate system transformation method.

In an exemplary embodiment, a computer program product is further provided, the computer program product, when executed by a processor, being used for implementing the foregoing image coordinate system transformation method.

"Plurality of" mentioned in the present disclosure means two or more. "And/or" describes an association relationship for describing associated objects and represents that three relationships may exist. For example, A and/or B may represent the following three cases: Only A exists, both A and B exist, and only B exists. The character "/" in the present disclosure generally indicates an "or" relationship between the associated objects.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An image coordinate system transformation method, applied to a computing device, the method comprising:
   obtaining video images acquired by adjacent cameras, the adjacent cameras including a first camera and a second camera that have an overlapping photography region on a ground plane;
   recognizing N groups of key points of a target object on the ground plane from the video images acquired by the adjacent cameras, each group of key points including first key point extracted from a video image of the first camera and a second key point extracted from a video image of the second camera, the first key point and the second key point being the same feature point of the same target object appearing in the adjacent cameras at the same moment, and N being an integer greater than or equal to 3; and calculating a transformation relationship between image coordinate systems of the adjacent cameras according to the N groups of key points.

2. The method according to claim 1, wherein recognizing N groups of key points of the target object comprises:

performing target detection and tracking on the video images acquired by the adjacent cameras respectively, to obtain a detection and tracking result corresponding to the first camera and a detection and tracking result corresponding to the second camera;

sifting out a standard target object according to the detection and tracking result corresponding to the first camera and the detection and tracking result corresponding to the second camera, the standard target object being the same target object appearing in the adjacent cameras at the same moment; and performing key point detection on the standard target object to obtain the N groups of key points.

3. The method according to claim 2, wherein sifting out the standard target object according to the detection and tracking result comprises:

obtaining, according to the detection and tracking result corresponding to the first camera, an appearance feature of a first target object obtained through detection and tracking from a first video image acquired by the first camera;

obtaining, according to the detection and tracking result corresponding to the second camera, an appearance feature of a second target object obtained through detection and tracking from a second video image acquired by the second camera, the first video image and the second video image being video images acquired by the adjacent cameras at the same moment;

calculating a similarity between the appearance feature of the first target object and the appearance feature of the second target object; and determining that the first target object and the second target object are the standard target object in response to determining the similarity is greater than a similarity threshold.

4. The method according to claim 3, further comprising:

sifting out the first video image and the second video image that meet a condition according to the detection and tracking result corresponding to the first camera and the detection and tracking result corresponding to the second camera, the condition including that a quantity of target objects obtained through detection and tracking from the first video image is 1 and a quantity of target objects obtained through detection and tracking from the second video image is also 1.

5. The method according to claim 2, wherein performing key point detection on the standard target object comprises:

extracting, in response to determining the standard target object is a pedestrian, midpoints of connecting lines between two feet of the standard target object, to obtain the N groups of key points.

6. The method according to claim 2, further comprising:

obtaining, for each group of key points, a confidence level corresponding to the key point; and removing the key point in response to determining the confidence level corresponding to the key point is less than a confidence level threshold.

7. The method according to claim 1, wherein the N groups of key points come from video images of the same target object at N different moments.

8. The method according to claim 1, wherein calculating the transformation relationship between image coordinate systems of the adjacent cameras comprises:

calculating an affine transformation matrix between the image coordinate systems of the adjacent cameras according to the N groups of key points.

9. The method according to claim 1, further comprising:

calculating, for any object obtained through detection and tracking from the video image of the first camera, position coordinates of the object in an image coordinate system corresponding to the second camera according to position coordinates of the object in an image coordinate system corresponding to the first camera and the transformation relationship.

10. An image coordinate system transformation apparatus, the apparatus comprising: a memory storing computer program instructions; and a processor coupled to the memory and configured to execute the computer program instructions and perform:

obtaining video images acquired by adjacent cameras, the adjacent cameras including a first camera and a second camera that have an overlapping photography region on a ground plane;

recognizing N groups of key points of a target object on the ground plane from the video images acquired by the adjacent cameras, each group of key points including a first key point extracted from a video image of the first camera and a second key point extracted from a video image of the second camera, the first key point and the second key point being the same feature point of the same target object appearing in the adjacent cameras at the same moment, and N being an integer greater than or equal to 3; and calculating a transformation relationship between image coordinate systems of the adjacent cameras according to the N groups of key points.

11. The apparatus according to claim 10, wherein the processor is further configured to execute the computer program instructions and perform:

performing target detection and tracking on the video images acquired by the adjacent cameras respectively, to obtain a detection and tracking result corresponding to the first camera and a detection and tracking result corresponding to the second camera;

sifting out a standard target object according to the detection and tracking result corresponding to the first camera and the detection and tracking result corresponding to the second camera, the standard target object being the same target object appearing in the adjacent cameras at the same moment; and performing key point detection on the standard target object to obtain the N groups of key points.

12. The apparatus according to claim 11, wherein the processor is further configured to execute the computer program instructions and perform:

obtaining, according to the detection and tracking result corresponding to the first camera, an appearance feature of a first target object obtained through detection and tracking from a first video image acquired by the first camera; obtain, according to the detection and tracking result corresponding to the second camera, an appearance feature of a second target object obtained through detection and tracking from a second video image acquired by the second camera, the first video image and the second video image being video images acquired by the adjacent cameras at the same moment;

calculating a similarity between the appearance feature of the first target object and the appearance feature of the second target object; and determining that the first target object and the second target object are the standard target object in response to determining the similarity is greater than a similarity threshold.

13. The apparatus according to claim 12, wherein the processor is further configured to execute the computer program instructions and perform:

sifting out the first video image and the second video image that meet a condition according to the detection and tracking result corresponding to the first camera and the detection and tracking result corresponding to the second camera, the condition including that a quantity of target objects obtained through detection and tracking from the first video image is 1 and a quantity of target objects obtained through detection and tracking from the second video image is also 1.

14. The apparatus according to claim 11, wherein the processor is further configured to execute the computer program instructions and perform:

in response to determining the standard target object is a pedestrian, extracting midpoints of connecting lines between two feet of the standard target object, to obtain the N groups of key points.

15. The apparatus according to claim 11, wherein the processor is further configured to execute the computer program instructions and perform:

obtaining, for each group of key points, a confidence level corresponding to the key point; and removing the key point in response to determining the confidence level corresponding to the key point is less than a confidence level threshold.

16. The apparatus according to claim 10, wherein the N groups of key points come from video images of the same target object at N different moments.

17. The apparatus according to claim 10, wherein the processor is further configured to execute the computer program instructions and perform:

calculating an affine transformation matrix between the image coordinate systems of the adjacent cameras according to the N groups of key points.

18. The apparatus according to claim 10, wherein the processor is further configured to execute the computer program instructions and perform:

calculating, for any object obtained through detection and tracking from the video image of the first camera, position coordinates of the object in an image coordinate system corresponding to the second camera according to position coordinates of the object in an image coordinate system corresponding to the first camera and the transformation relationship.

19. A non-transitory computer-readable storage medium storing computer program instructions executable by at least one processor to perform:

obtaining video images acquired by adjacent cameras, the adjacent cameras including a first camera and a second camera that have an overlapping photography region on a ground plane;

recognizing N groups of key points of a target object on the ground plane from the video images acquired by the adjacent cameras, each group of key points including first key point extracted from a video image of the first camera and a second key point extracted from a video image of the second camera, the first key point and the second key point being the same feature point of the same target object appearing in the adjacent cameras at the same moment, and N being an integer greater than or equal to 3; and calculating a transformation relationship between image coordinate systems of the adjacent cameras according to the N groups of key points.

20. The non-transitory computer-readable storage medium according to claim 19, wherein the computer program instructions are executable by the at least one processor to further perform:

performing target detection and tracking on the video images acquired by the adjacent cameras respectively, to obtain a detection and tracking result corresponding to the first camera and a detection and tracking result corresponding to the second camera;

sifting out a standard target object according to the detection and tracking result corresponding to the first camera and the detection and tracking result corresponding to the second camera, the standard target object being the same target object appearing in the adjacent cameras at the same moment; and performing key point detection on the standard target object to obtain the N groups of key points.

* * * * *